July 13, 1926.

C. TANBERG

MANURE SPREADER

Filed May 10, 1923

1,592,475

INVENTOR.
CARL TANBERG.
BY HIS ATTORNEY.
James F. Williamson

Patented July 13, 1926.

1,592,475

UNITED STATES PATENT OFFICE.

CARL TANBERG, OF ROTHSAY, MINNESOTA.

MANURE SPREADER.

Application filed May 10, 1923. Serial No. 637,924.

This invention relates to a manure spreader and particularly to an attachment therefor adapted to be applied to the rotary distributor commonly used. In a form of manure spreader which is now widely used there is a box body in which the manure is carried, which body has extending between its sides at its rear end a rotary distributor member usually comprising a cylindrical frame having radially projecting arms thereon. This distributor is carried by and driven from a shaft extending transversely of the body and carried in bearings at the sides thereof. When using this type of manure spreader it has been found in practice that the manure or material to be distributed enters between the end of the rotary distributor and bearings for the shaft carrying this distributor, thus interfering with the proper operation thereof. It is furthermore difficult and inconvenient to remove the material so entering between the distributor and around the bearing for said shaft.

It is an object of this invention, therefore, to provide a manure spreader including means combined with the rotary distributor for preventing the manure from reaching the end bearings for the shaft which carries the distributor.

It is a further object of the invention to provide a manure spreader having such means which are in the form of disks secured at each end of the rotary distributor between which disks the manure is discharged and which disks prevent the passage of the manure to the ends of the distributor.

It is more specifically an object of the invention to provide such disks as above referred to which are secured to the ends of the rotary distributing member by having clips at their inner sides embracing the endmost projecting arms on said rotary distributing member.

Figure 1:
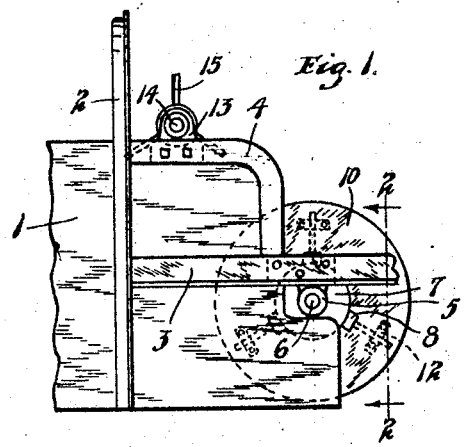
Figure 2:
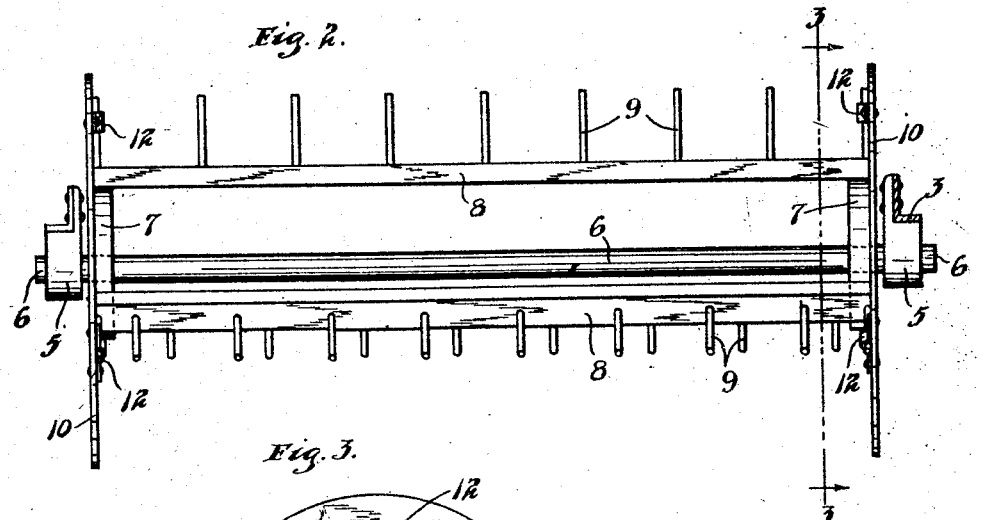
Figure 3:
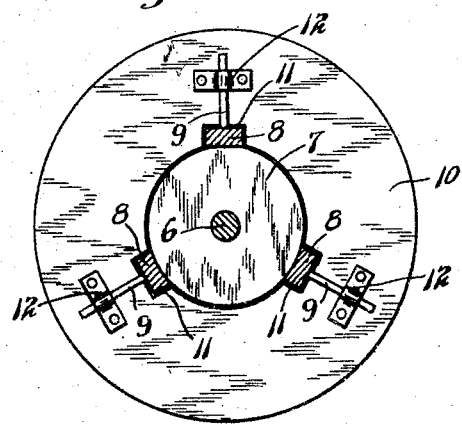

These and other objects and advantages of the invention will be fully set forth in the following description made in connection with the accompanying drawings in which like reference characters refer to the same parts throughout the different views, and in which, Fig. 1 is a view in side elevation of the rear portion of a manure spreader of common type showing part of the mechanism therefor;

Fig. 2 is a vertical section taken on the line 2—2 of Fig. 1, as indicated by the arrows, the body of the manure spreader not being shown; and Fig. 3 is a vertical section taken on the line 3—3 of Fig. 2, as indicated by the arrows.

Referring to the drawings, in Fig. 1 a rear end of a manure spreader is shown having a body with side portions 1. A bail member 2 illustrated as being formed of angle iron, is secured to the exterior of the side 1 and extends across the top of the body and is similarly secured to the other side thereof. Another angle bar 3 extends rearwardly along the side of the body in a horizontal position, being secured to the member 1 and to a reinforcing bar 4 extending around the upper part of the rear portion of the side 1. The angle bars 3, of which there will be one at each side of the body, have riveted or bolted thereto depending bearings 5 in which are journaled the ends of a shaft 6, which shaft carries the rotary distributing member which discharges the manure from the rear end of the body. While the distributing member may be of any desired construction, in the embodiment of the invention illustrated, the same is shown as comprising end disks 7 secured to the shaft 6 adjacent the bearings 5, and circumferentially spaced bars 8 are secured to the outer portion of said disks and extend therebetween. Each of the bars 8 has a series of radially projecting pins or teeth 9 secured thereto. In accordance with the present invention, annular members 10 are provided and one of these members 10 is secured at each end of the rotary distributor. Said members 10 are provided with central apertures, thus rendering the same of annular form and this aperture is of the size to fit closely over the disk 7. The annular plates 10 then are further provided with notches or slots 11 which fit closely over the ends of the bars 8 and each plate has also secured thereto at its inner side, spaced clips 12 which receive the endmost ones of the teeth 9. The clips 12 are suitably bolted or riveted to the plates 10 and tightly clamp the plates against the teeth 9. An auxiliary distributor is illustrated as supported in bearings 13 secured adjacent the top of the sides 1 which is carried on a shaft 14 and comprises a series of circumferentially spaced radial arms 15.

In operation, the manure is fed rearwardly in the body by means (not shown) and is engaged and projected from the body by the teeth 9. Manure will thus pass between the annular plate 10 and these plates being of comparatively large size and passing very close to the bottom of the body, will prevent any of the manure from passing to the outside thereof so as to come in contact with the bearings 5. The said bearings and end portions of the shaft 6 therefore will thus be completely protected from the material carried in the body and discharged by the rotary distributor. The objectionable clogging of material about these bearings which has previously occurred will thus be eliminated.

From the above description it will be seen that applicant has provided a structure of manure spreader overcoming a serious objection to previous spreaders and one which has great utility. The protecting disks can be readily attached to a standard form of manure spreader and the improvement made can be installed at small expense.

It will, of course, be understood that various changes may be made in the form, details and proportions of the parts without departing from the scope of applicant's invention, which, generally stated, consists in a device capable of carrying out the objects above enumerated and such as shown and described and set forth in the appended claims.

What is claimed is:

1. The combination with a manure spreader having a body, side walls, a substantially horizontal shaft extending transversely adjacent one end thereof, bearings supported on said side walls in which the ends of said shafts are journaled, a distributing device secured to said shaft including end members disposed in vertical planes, and annular plates secured to said device at the outer ends of said end members and disposed closely adjacent said side walls whereby the material distributed and discharged from said body by said distributing device is prevented from reaching the ends of said shaft and said bearings.

2. The combination with a manure spreader having a body, a shaft extending transversely thereof disposed in bearings adjacent its rear end and carrying a distributing member, which member comprises circumferentially spaced rows of radially extending teeth, of an annular plate secured to said member at each end thereof, said plate being rigidly secured to and carried by the endmost teeth of said rows.

3. In a manure spreader having a body, a distributing member carried on a shaft journaled at each end in bearings supported by said body and comprising end disks, circumferentially spaced bars extending therebetween, and a series of radially projecting teeth on each bar, an annular plate secured at the outer edge of each of said end disks having circumferentially spaced clips on its inner side embracing and clamping the same to the endmost of said radially projecting teeth, said plates also having notches receiving the end portions of said bars.

In testimony whereof I affix my signature.

CARL TANBERG.